US011824823B2

(12) United States Patent
Cha et al.

(10) Patent No.: US 11,824,823 B2
(45) Date of Patent: Nov. 21, 2023

(54) INSTANT MESSAGING SERVER PROVIDING MULTIPLE TYPES OF CHAT ROOMS

(71) Applicant: KAKAO CORP., Jeju-si (KR)

(72) Inventors: Han Wool Cha, Seongnam-si (KR); Eun Hye Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 17/517,669

(22) Filed: Nov. 3, 2021

(65) Prior Publication Data

US 2022/0150205 A1    May 12, 2022

(30) Foreign Application Priority Data

Nov. 9, 2020  (KR) .................. 10-2020-0148892

(51) Int. Cl.
*H04L 51/18* (2022.01)
*H04L 51/216* (2022.01)
(Continued)

(52) U.S. Cl.
CPC .......... *H04L 51/18* (2013.01); *G06F 21/6218* (2013.01); *H04L 51/046* (2013.01); *H04L 51/216* (2022.05); *G06F 2221/2141* (2013.01)

(58) Field of Classification Search
CPC ...... H04I 51/18; H04L 51/216; H04L 51/046; G06F 21/6218

See application file for complete search history.

(56) References Cited

U.S. PATENT DOCUMENTS 6,772,195 B1 * 8/2004 Hatlelid .............. G06F 3/04815
709/224
8,332,760 B2 * 12/2012 Keohane ................. H04L 51/04
715/752

(Continued)

FOREIGN PATENT DOCUMENTS

JP    2007-328685 A    12/2007
JP    2017-502436 A    1/2017

(Continued)

OTHER PUBLICATIONS

"KakaoWork Unveiled to Protect Employees from Invasive KakaoTalk Work Instructions" Chosunbiz, Sep. 16, 2020, Retrieved from the Internet <URL: https://biz.chosun.com/site/data/html_dir/2020/09/16/2020091601458.html> English abstract.

(Continued)

*Primary Examiner* — Sargon N Nano
(74) *Attorney, Agent, or Firm* — CANTOR COLBURN LLP

(57) ABSTRACT

Provided are an instant messaging server providing a plurality of types of chat rooms, and a method of operating the instant messaging server. The method includes storing chat data transmitted and received in a first type chat room in a shared drive corresponding to an administrator with a first type account having an authority to manage the chat room, receiving, from a participant participating in a chat room, a request for previous chat data transmitted and received in the chat room before the participant started participating, and providing the previous chat data stored in the shared drive to the participant based on an access authority of the shared drive set in response to a chat room type.

20 Claims, 11 Drawing Sheets

(51) Int. Cl.
*G06F 21/62* (2013.01)
*H04L 51/046* (2022.01)

(56) References Cited

U.S. PATENT DOCUMENTS

| | | | | |
|---|---|---|---|---|
| 9,509,521 | B2* | 11/2016 | Hoomani | G06Q 10/10 |
| 9,652,810 | B2* | 5/2017 | Richter | G06Q 10/107 |
| 9,990,108 | B2* | 6/2018 | Henderson | H04L 51/04 |
| 10,958,459 | B2* | 3/2021 | Zhang | H04L 12/1831 |
| 2004/0111479 | A1* | 6/2004 | Borden | H04L 51/04 |
| | | | | 709/206 |
| 2007/0288560 | A1* | 12/2007 | Bou-Ghannam | H04L 12/1822 |
| | | | | 709/204 |
| 2010/0205541 | A1* | 8/2010 | Rapaport | G06Q 10/10 |
| | | | | 715/753 |
| 2011/0055735 | A1* | 3/2011 | Wood | H04L 12/1827 |
| | | | | 709/206 |
| 2011/0239135 | A1* | 9/2011 | Spataro | G06F 16/93 |
| | | | | 715/753 |
| 2012/0331067 | A1* | 12/2012 | Richter | H04L 51/52 |
| | | | | 709/206 |
| 2013/0073636 | A1* | 3/2013 | Zhu | H04L 12/1818 |
| | | | | 709/206 |
| 2014/0114973 | A1* | 4/2014 | Wetherell | G06F 16/35 |
| | | | | 707/737 |
| 2016/0330150 | A1* | 11/2016 | Joe | G06F 3/0486 |
| 2017/0041263 | A1* | 2/2017 | Shekel | H04L 51/04 |
| 2018/0284961 | A1* | 10/2018 | Henderson | G06F 3/0488 |

FOREIGN PATENT DOCUMENTS

| | | |
|---|---|---|
| KR | 10-2020-0020656 A | 2/2020 |
| KR | 10-2020-0047206 A | 5/2020 |
| KR | 10-2103015 B1 | 5/2020 |
| WO | 2015/099833 A9 | 7/2015 |

OTHER PUBLICATIONS

"KakaoWork as Team Chat App", Oct. 14, 2020, Retrieved from the Internet <URL: https://news.appstory.co.kr/apps13937>, English abstract.

Japanese Office Action for JP Application No. 2021-171044 dated Oct. 4, 2022.

* cited by examiner

INSTANT MESSAGING SERVER PROVIDING MULTIPLE TYPES OF CHAT ROOMS

CROSS-REFERENCE TO RELATED APPLICATIONS

This application claims the benefit under 35 USC § 119(a) of Korean Patent Application No. 10-2020-0148892, filed on Nov. 9, 2020, in the Korean Intellectual Property Office, the entire disclosure of which is incorporated herein by reference for all purposes.

BACKGROUND

1. Field

The following description relates to an instant messaging server that provides multiple types of chat rooms and a method of operating the instant messaging server.

2. Description of Related Art

An instant messaging service is a service for transmitting and receiving messages between two or more users using a network, which may be provided to a user through a client program called an instant messenger. Unlike an existing instant messenger that transmits and receives messages in text form, an instant messenger may be provided with various functions, such as transmitting and receiving various types of media files including photo, video, and voice files, and group data transmission and reception functions allowing communication between two or more users at the same time. The use of instant messengers in user terminals such as mobile communication terminals and personal computers (PC) has been recently increasing, and thus there is a demand for developing various and convenient instant messaging service technologies for sharing conversations and/or data with other participants by participating in a chatroom, of which there are a large number and a variety.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One or more example embodiments provide an instant messaging service for satisfying various needs of an instant user and an instant messaging technology that allows multiple users to efficiently share data transmitted and received through a chat room.

One or more example embodiments provide an instant messaging technology using multiple types of chat rooms in which a method of managing data transmitted and received through a chat room is diversified.

However, technical tasks to be achieved by the present disclosure are not limited to the above-described technical tasks, and other technical tasks may exist.

According to an aspect, there is provided a method of operating an instant messaging server, the method including storing chat data transmitted and received in a first type chat room in a shared drive corresponding to an administrator with a first type account having an authority to manage the chat room, receiving, from a participant participating in a chat room, a request for previous chat data transmitted and received in the chat room before the participant started participating, and providing the previous chat data stored in the shared drive to the participant based on an access authority of the shared drive set in response to a chat room type.

The method may further include changing the access authority of the shared drive based on a type conversion of the chat mom by an administrator account.

The method may further include converting the chat room type into a second type when an administrator account is converted into a second type account, and terminating use of the shared drive in response to a type conversion of the chat room.

The method may further include managing the first type chat room in a suspended state when an administrator account is converted into a second type account, and restricting access to the chat data stored in the shared drive while the suspended state continues.

The method may further include converting the chat room type into a second type based on a duration of the suspended state, and terminating use of the shared drive based on a type conversion of the chat room.

The method may further include removing an access restriction on the chat data stored in the shared drive when the administrator account is converted into the first type account in the suspended state.

The method may further include removing an access restriction on the chat data stored in the shared drive when an administrator authority is transferred to a participant with the first type account participating in the chat room in the suspended state.

The method may further include receiving, from a user, a request to generate the chat room to which at least one participant is assigned, generating, as the first type, the chat room comprising the user and at least one participant based on an account type of the user, allocating a space for the chat room in the shared drive, and setting the user as the administrator of the chat room.

The method may further include storing at least one of the chat data transmitted and received in the chat room alter the participant started participating and the previous chat data in a personal drive corresponding to the participant based on an account type of the participant.

The method may further include deleting the chat data stored in the shared drive corresponding to the administrator in response to a request to terminate the chat room, and deleting the chat data stored in the personal drive corresponding to the participant.

According to another aspect, there is provided an instant messaging server, the instant messaging server including a processor. The processor may store chat data transmitted and received in a first type chat room in a shared drive corresponding to an administrator with a first type account having an authority to manage the chat room, receive, from a participant participating in a chat room, a request for previous chat data transmitted and received in the chat room before the participant started participating, and provide the previous chat data stored in the shared drive to the participant based on an access authority of the shared drive set in response to a chat room type.

The processor may convert the chat room type into a second type when an administrator account is converted into a second type account, and terminate use of the shared drive in response to a type conversion of the chat room.

The processor may manage the first type chat room in a suspended state when an administrator account is converted into a second type account, and restrict access to the chat data stored in the shared drive while the suspended state continues.

The processor may convert the chat room type into a second type based on a duration of the suspended state, and terminate use of the shared drive based on a type conversion of the chat room.

The processor may remove an access restriction on the chat data stored in the shared drive when the administrator account is converted into the first type account in the suspended state.

The processor may remove an access restriction on the chat data stored in the shared drive when an administrator authority is transferred to a participant with the first type account participating in the chat room in the suspended state.

The processor may receive, from a user, a request to generate the chat room to which at least one participant is assigned, generate, as the first type, the chat room comprising the user and at least one participant based on an account type of the user, allocate a space for the chat room in the shared drive, and set the user as the administrator of the chat room.

The processor may store at least one of the chat data transmitted and received in the chat room after the participant started participating and the previous chat data in a personal drive corresponding to the participant based on an account type of the participant.

The processor may delete the chat data stored in the shared drive corresponding to the administrator in response to a request to terminate the chat room, and delete the chat data stored in the personal drive corresponding to the participant.

Other features and aspects swill be apparent from the following detailed description, the drawings, and the claims.

BRIEF DESCRIPTION OF IRE DRAWINGS

Figure 1:
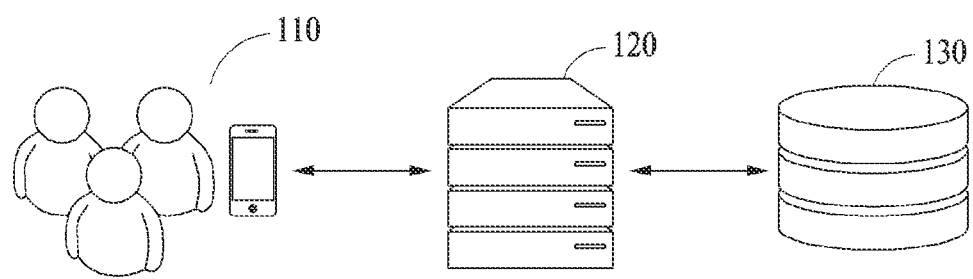
FIG. 1 illustrates an example of an instant messaging system providing a plurality of types of chat rooms according to an example embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an instant messaging system providing a plurality of types of chat rooms according to an example embodiment.

Referring to FIG. 1, a system may include at least one of a user terminal 110, an instant messaging server, and a database 130. Hereinafter, the instant messaging server may be simply referred to as a server 120. The user terminal 110 and the server 120 may perform data exchange communication through a network, and the server 120 may access the database 130 and manage the database 130 by storing or obtaining data.

The user terminal 110 may include, for example, a personal computer (PC), a netbook, a laptop, a personal digital appliance (PDA), a smart phone, a wearable device, and various user display devices for performing a similar function.

The user terminal 110 may be implemented by an installed instant messenger application. The instant messenger application may include an application associated with a social networking service (SNS) having an instant messenger function. A user may use an instant messaging service provided by the server 120 through the instant messenger application installed in the user terminal 110. For example, the user may subscribe to the instant messaging service through an application installed in a terminal, generate an account, and use the instant messaging service corresponding to the generated account.

The server 120 may provide the instant messaging service and include at least one processor to perform a process for the instant messaging service. The server 120 may be linked with the instant messenger application installed in the user terminal 110 for a user interface (UI), a function, an operation, or a service. The server 120 may generate a chat room corresponding to accounts of users, provide a function of transmitting and receiving data between the user terminals 110, and store and manage data associated with the instant messaging service.

The chat room generated by the server 120 may include one or more of participants, and a participant may correspond to an account of a user subscribed to the instant messaging service. The participant may transmit and receive a message including visual information (e.g., a text, an emoticon, a shape, etc.) and a message including audio information (e.g., a voice) with other participants through the chat room. In addition, various types of media files (e.g., photo file, video file, audio file, etc.) may be transmitted and received through the chat room. Hereinafter, messages and media files transmitted and received in a chat room may be referred to as chat data.

The server 120, or the instant messaging server, may deliver chat data transmitted from the participant of the chat room through the chat room to the other participants of the chat room and perform a process of delivering an instant message. For example, the server 120 may store the chat data transmitted through the chat room in the database 130 and provide a notification that the chat data has been received for the user terminals 110 of the participants in the chat room through a push server. The participant of the chat room may access the chat room through the instant messenger application installed in the user terminal 110, and the server 120 may respond to the participant accessing the chat room and transmit the chat data stored in the database 130 to the user terminal 110 of the participant accessing the chat room.

The server 120 may provide various types of chat rooms including a first type and a second type. Authority to open a chat room, authority to participate in a chat room, a memory in which chat data is stored, and access authority of the memory in which the chat data is stored may be determined differently for the various types of chat rooms. For example, a first type chat room (e.g., a team chat room), may restrict authority of a user (e.g., a user with access to cloud storage separate from the instant messaging server) to open a chat room, and a second type chat room (e.g., a general chat room) may not restrict authority of the user to open the chat room. Unlike a general chat room, a team chat room may provide a function of viewing chat data before participating in the chat room. To be described in detail hereinafter, the chat data of the team chat room may be stored in a shared drive of cloud storage of an administrator, and the participant may view previous chat data before he or she participates in the team chat room by accessing the shared drive of the administrator.

For example, chat data of the first type chat room may be stored in a first database a mailbox) and a separately allocated second database (e.g., cloud storage) corresponding to an account of the participant. In contrast, chat data of the second type chat room may be stored in a first database (e.g., a mailbox) only. A message transmitted through a chat room may be delivered to the participants of the chat room through the mailbox or the cloud storage. Here, the chat data stored in a mailbox may be deleted when a preset duration elapses, whereas the chat data stored in cloud storage may be maintained with no limit on duration. In addition, the mailbox may be useable irrespective of user account type, whereas the cloud storage may be only useable for some account types.

In another example, access authority of a memory in which the chat data of the first type chat room is stored and access authority of a memory in which the chat data of the second type chat room is stored may be determined differently from each other.

The first type chat room may be converted into the second type chat room. The server 120 may determine a preset condition under which the first type chat room may be converted into the second type chat room, and when the condition is satisfied, the first type chat room may be converted into the second type chat room. When the first type chat room is converted into the second type chat room, the chat data corresponding to the converted chat room may be deleted from the memory (e.g., cloud storage) storing the chat data of the first type chat room and be stored in the memory corresponding to the second type chat room. When the first type chat room is converted into the second type chat room, access authority of the memory in which the chat data is stored may be changed from access authority of the memory corresponding to the first type chat room to access authority of the memory corresponding to the second type chat room.

Functions provided by the first type chat room may be partially restricted based on a state of the chat room. For example, when the first type chat room is in a normal use state, all functions of the first type chat room may be activated and in contrast, when the first type chat room is in another state (e.g., a suspended state) that is different from the normal use state, functions of the first type chat room may be partially deactivated. In addition, when the state of the first type chat room is changed from the normal use state to another state, access authority of the memory corresponding to the first type chat room may be changed.

Hereinafter, a first type chat room may be referred to as a team chat room, and a second type chat room may be referred to as a general chat room.

Figure 2:
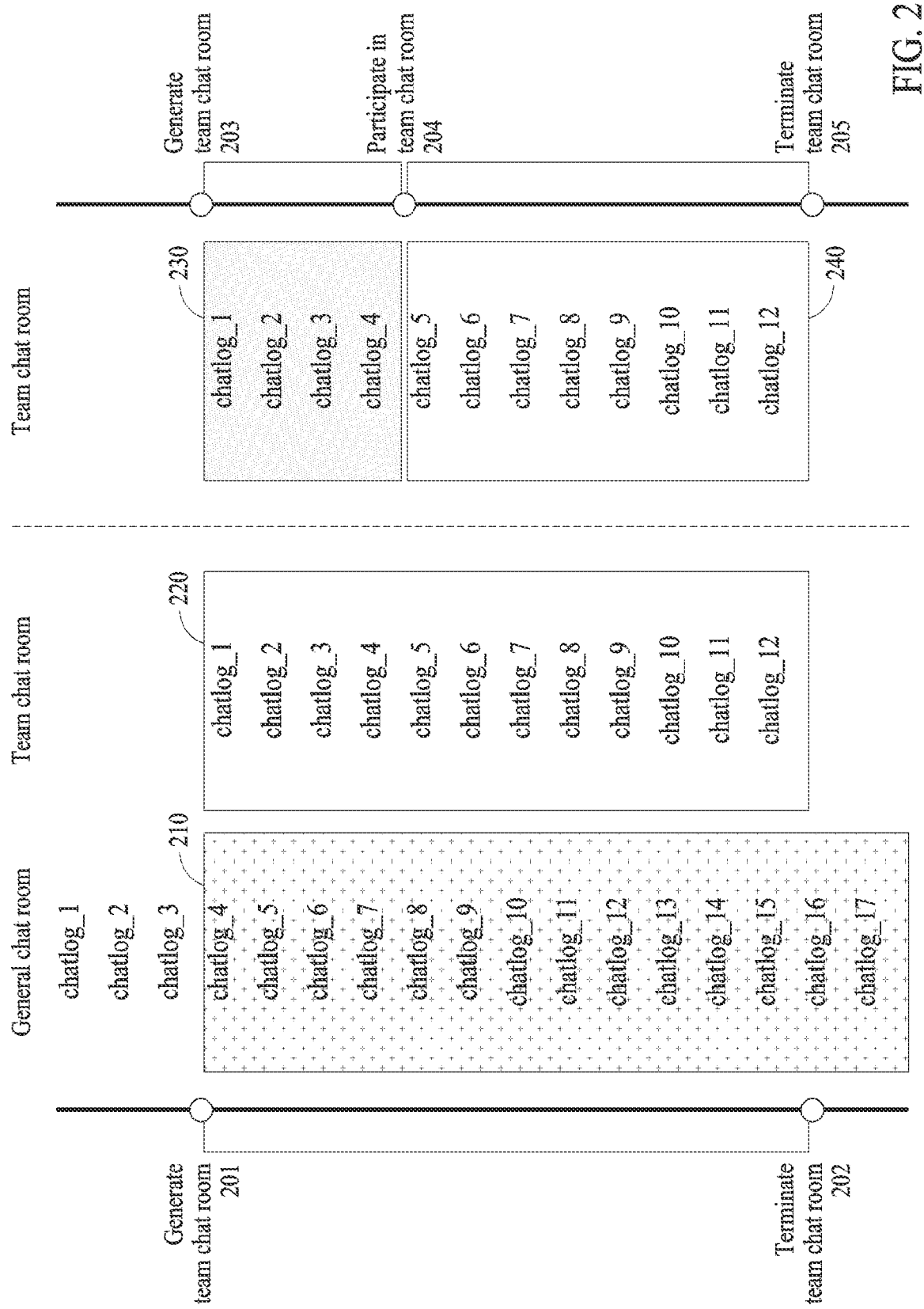
FIG. 2 illustrates an example of comparing types of chat rooms according to an example embodiment.

The database 130 may store chat data in response to a chat room, and a duration in which the chat data is stored in the database 130 may be different based on a chat room type (e.g., a team chat room or a general chat room), A separate database corresponding to an account of a user may be constructed. The database 130 corresponding to the account of the user may store the chat data corresponding to the account of the user. The database 130 for storing chat data may be configured differently based on the user account type, and a duration for which the chat data is stored in the database 130 may be different, FIG. 2 illustrates an example of comparing types of chat rooms according to an example embodiment.

According to an example embodiment, a server may provide a team chat room, which is different from a general chat room, A user who can open the team chat room may be limited to a user with a first type account (e.g., a paid account), and at least one participant with the first type account among participants of the team chat room may be an administrator having authority to manage the team chat room. The user who opens the team chat room may be set as the administrator of the team chat room, and administrator authority may be transferred to another participant with the first type account by the administrator. Chat data transmitted and received through the team chat room may be stored in a shared drive corresponding to the administrator. A user with a second type account (e.g., an unpaid member) may not have authority to open the team chat room and may not have authority to administrate the team chat room.

The user with the first type account may be provided swim cloud storage. The cloud storage provided to the user with the first type account may include a personal drive and a shared drive. Chat data transmitted and received in the general chat room may be stored in the personal drive, and chat data transmitted and received in the team chat room in which the user has administrator authority may be stored in the shared drive.

A user account type subscribed to an instant messaging service may be classified into a plurality of types, and available instant messaging services may be classified based on the user account type. Hereinafter, a first type account will be described as an example of opening a team chat room having authority to use a cloud storage separately from the server, and other account types will be described as examples of other account types (e.g., a second type account). For example, the user account type may be classified into a paid member and an unpaid member. A paid member may correspond to the account type of a user using additional paid services by paying a separate fee for the instant messaging service, and an unpaid member may correspond to the account type of a user using basic services without paying a separate fee for the instant messaging service. The server may provide the cloud storage to the account of the paid member by allocating a storage space corresponding to the account of the paid member.

That is, the user with the first type account have authority to generate a team chat room. The server may provide a function of opening a team chat room to a user with the first type account having authority to open the team chat room. The server may receive a request to open the team chat room from the user with the first type account having authority to open the team chat room and generate the team chat room in response to an open request. The user with the second type account having no authority to open the team chat room may not be allowed to make a request to open the team chat room to the server, and even if the team chat room is opened by a request, it may be determined Whether the account of the user making the request to open the team chat room to the server corresponds to a preset account type having authority to open the team chat room. Thus, it may be determined whether the team chat room may be opened or not.

Referring to FIG. 2, a user with a first type account attempting to open a chat room may open a general chat room and a team chat room. The user may open the team chat room at a generation point 201 after registering with the first type account, that is, after an account type of the user is changed to a first type. A general chat room may be opened irrespective of whether the user is registered with the first type account. That is, the user may open the general chat room even before registering with the first type account.

When a team chat room is opened, at least one participant with the first type account among participants of the team chat room may be set as an administrator of the team chat room. A server may automatically set a team chat room generator as the administrator of the team chat room. Another participant corresponding to the first type account among the participants of the team chat room may be set as the administrator based on a preset standard. For example, when a team chat room is generated, a user assigned by the team chat room generator may be set as the administrator.

After a team chat room is opened, chat data 220 transmitted and received in the team chat room may be stored in a shared drive corresponding to the administrator of the team chat room until a termination point 202 of the team chat room. The shared drive corresponding to the administrator of the team chat room may be storage allocated to the administrator account and be included in a drive provided to the user with the first type account. The server may allocate a space for the team chat room in the shared drive corresponding to the administrator of the team chat room and store the chat data transmitted and received in the team chat room in the shared drive corresponding to the administrator of the team chat room. The chat data stored in the shared drive may be viewed and managed through the team chat room, and the participants in the team chat room may share the chat data stored in the shared drive through the team chat room. For example, a participant may make a request to the server for the chat data transmitted and received in the team chat room before he or she started participating in the team chat room, and the server receiving the request may view the requested chat data requested in the shared drive and provide the chat data to the participant through the team chat room.

The chat data transmitted and received in a general chat room may be stored in a personal drive corresponding to the account of the participant based on the account type of the participant in the general chat room. The personal drive corresponding to the account of the participant may be storage allocated to the account of the participant and be included in the drive provided to a user with the first type account. Chat data 210 transmitted and received in a chat room in which the participant is participating after the account of the participant is converted into the first type account may be stored in the personal drive of the participant.

A team chat room may be terminated because of termination conditions set in response to the team chat room. The termination conditions set in response to the team chat room may include conditions such as when the team chat room is deleted by the administrator, when the team chat room has no participants, and when the administrator account is converted. When the team chat room is terminated, the team chat room may be converted into a general chat room.

When the administrator account is converted into the second type account, a team chat room may be terminated. That is, when the user account type set as the administrator of the team chat room is converted into another type and the administrator loses the authority, the team chat room may be terminated. For example, when a first type account of the administrator of the team chat room is closed, the team chat room may be terminated. In another example, when the first type account of the administrator of the team chat room is closed, the team chat room may be terminated after a preset suspension period elapses from a time point at which the first type account is closed.

A general chat room may be maintained irrespective of a conversion of an account type of a generator or a participant of the general chat room. For example, a general chat room opened by the administrator of a team chat room may not be terminated even when the administrator account of the team chat room is converted into the second type account. A general chat room may be terminated by termination conditions set in response to the general chat room, and the termination conditions set in response to a general chat room and a team chat room may be conditions independent from each other.

When a team chat room is generated, the participants of the team chat room may include users assigned by the generator and users invited after the team chat room is generated. The administrator of the team chat room may have authority to manage the participants of the team chat room. For example, after the team chat room is generated, a participant may be invited to the team chat room by the administrator of the team chat room, and the participant may be removed from the team chat room by the administrator. Authority to add a participant may be given to another participant, in addition to the administrator.

The participant of a team chat room may view the chat data transmitted and received in the team chat room through the team chat room and transmit and receive data (e.g., messages, media files, etc.) with other participants through the team chat room. That is, the participants of a team chat room may share data through the team chat room. A user removed from the team chat room may have no access to the team chat room to view the chat data of the team chat room and may not transmit and receive data through the team chat room.

For example, referring to FIG. 2, when a first participant participates in the team chat room after the team chat room is generated, the first participant may receive previous chat data 230 and chat data 240 transmitted and received in the team chat room through the team chat room. The previous chat data 230 and the chat data 240 transmitted and received in the team chat room may be classified into chat data previously transmitted and received in the team chat room from a generation point 203 of the team chat room to a participation point 204 of the team chat room in which the first participant is participating and chat data that is transmitted and received in the team chat room from the generation point 203 and a termination point 205 of the team chat room, After starting to participate, the first participant may transmit and receive chat data with other participants through the team chat room and receive the previous chat data 230, in addition to the chat data 240.

The server may provide a function of retrieving the previous chat data 230 for a participant of a team chat room using the shared drive corresponding to the administrator account of the team chat room, After the team chat room is generated, the first participant participating in the team chat room may use a previous chat data retrieval function to retrieve the previous chat data 230 by making a request to the server for the previous chat data 230 before participating in the team chat room. The previous chat data retrieval function may provide chat data transmitted and received in the team chat room to the participant through the team chat room before the participant starts participating in the team chat room. The server may store the chat data transmitted and received through the team chat room in the shared drive corresponding to the administrator account of the team chat room and provide the previous chat data retrieval function to the participant of the team chat room by displaying the chat data stored in the shared drive in the team chat room.

It may be determined whether a function for retrieving the previous chat data 230 is to be provided to the participant based on access authority of the shared drive. Access authority of the shared drive may allow the controlling of access to the shared drive. Access authority may include, for example, authority to perform an operation to read data stored in the shared drive and authority to perform an operation to write data in the shared drive. It may be determined whether access to the chat data stored in the shared drive is restricted (e.g., a team chat room in a suspended state) and whether use of the shared drive is suspended (e.g., a team chat room is terminated) based on access authority of the shared drive. Access authority of the shared drive may change based on a type or a state of a chat room. Changing access authority of the shared drive is described below.

The server receiving a request for previous chat data may provide the previous chat data 230 stored in the shared drive to the participant based on a right to access the shared drive set in response to a team chat room. When access to the shared drive corresponding to the administrator account is allowed, the previous chat data retrieval function may be provided. When access to the shared drive corresponding to the administrator account is restricted, the previous chat data retrieval function may not be provided. Before providing the previous chat data 230 to the participant, the server may determine whether access to the shared drive for viewing the previous chat data 230 is allowed based on access authority of the shared drive set in response to the state of the chat room. When access to the previous chat data 230 stored in the shared drive is not allowed based on access authority of the shared drive, the first participant may be restricted from being provided with the previous chat data 230.

The previous chat data 230 and the chat data 240 transmitted and received through a team chat morn may be separately stored in the personal drive corresponding to the account of the participant, where the account is the first type account. The previous chat data 230 and the chat data 240 that the participant can access through the team chat room may be stored in the personal drive of the participant based on settings of the participant with the first type account. For a participant with the second type account, a separate cloud storage may not be used, and the previous chat data 230 and the chat data 240 transmitted and received through the team chat room may not be stored in the separate cloud storage corresponding to the second type account.

The server may store, in the personal drive corresponding to the participant, at least one of the chat data 240 transmitted and received in a team chat room after the participant with the first account type started participating and the previous chat data 230 transmitted and received in the team chat room before the participant started participating. For example, chat data stored in the personal drive corresponding to the account of the participant may include the previous chat data 230 transmitted and received in the team chat room after the participant started participating, in addition, when the previous chat data 230 is provided through the previous chat data retrieval function in the team chat room corresponding to the participant, chat data stored in the personal drive corresponding to the account of the participant may include the previous chat data 230.

FIGS. 3A through 4B illustrate examples of access authority of a shared drive according to example embodiments.

According to an example embodiment, access authority of a shared drive may be s determined based on a chat room type. For example, in a case of a team chat room, when a shared drive corresponding to an administrator account is accessed, chat data transmitted and received in the team chat room may be stored in the shared drive, and access authority of the shared drive may be determined such that the chat data stored in the shared drive may be viewed through the team chat room by a participant other than the administrator of the team chat room. In a case of a general chat room, chat data transmitted and received in the general chat room may not be stored in the shared drive, and access authority of the shared drive may be determined such that a participant of the general chat room may not view the chat data stored in a drive corresponding to the account of another participant through the chat room. For a general chat room, access authority of the shared drive may be determined such that use of the shared drive is terminated.

As described above, a team chat room may be converted into a general chat room based on a type conversion of the administrator account, in addition, access authority of the shared drive may change based on the changed account type of the administrator. When the administrator account is converted into the second type account, the server may convert the chat room type into a normal chat room type and terminate use of the shared drive.

Access authority of the shared drive may be determined differently based on a state of a team chat room. When the chat room type is the team chat room type, access authority of the shared drive may change as the state of the team chat room changes. For example, when the team chat room is in a normal use state, the chat data may be stored in the shared drive of the administrator, and access authority of the shared drive may be determined such that the chat data stored in the shared drive is accessible. When the team chat room is in a state different from the normal use state, storing the chat data in the shared drive may be restricted, or access authority of the shared drive may be determined such that access to the chat data stored in the shared drive is restricted. For example, when the team chat room is in a suspended state, the chat data in the shared drive may be stored, and access authority of the shared drive may be determined such that viewing the chat data stored in the shared drive is restricted. Here, the suspended state may be a state in which a conversion occurs when conditions for maintaining a first type account are not temporarily satisfied. For example, when an administrator with the first type account does not meet the conditions for maintaining the first type account (e.g., unpaid expenses), a suspended state may be applied.

The state of a team chat room may change according to an administrator account of the team chat room. When the administrator account of the team chat room is converted, the state of the team chat room may change. For example, when an account type of a user set as an administrator of a chat room is converted into a second type account, and the administrator loses the authority, the team chat room may change to be in the suspended state. According to an example embodiment, when an administrator account is converted into the second type account, the server may manage the team chat room in the suspended state, and while the suspended state continues, access to the chat data stored in the shared drive may be restricted.

Figure 3A:
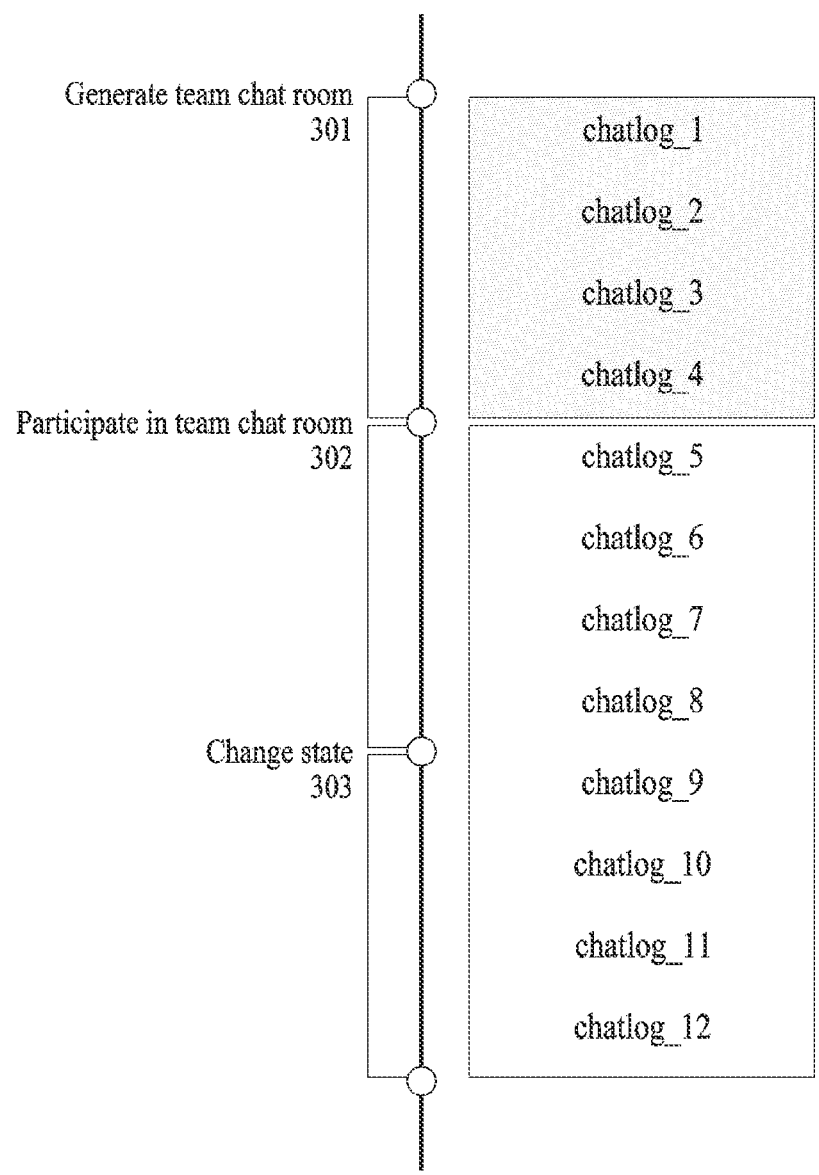
FIGS. 3A through 4B illustrate examples of access authority of a shared drive according to example embodiments.
Figure 3B:
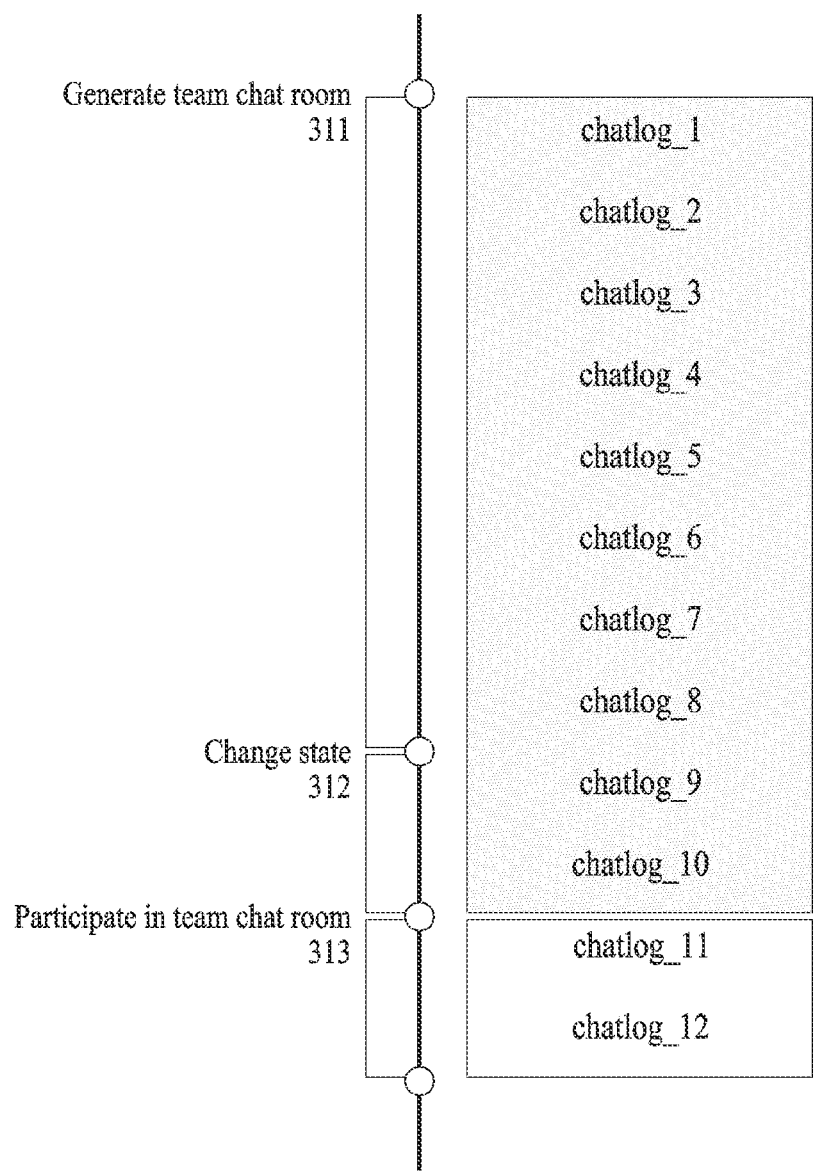

Referring to FIGS. 3A and 3B, after a team chat room is opened, an administrator account of the team chat room may be converted from a first type account into a second type account, and thus a state of the team chat room may change. The state of the team chat room from generation points 301 and 311 of the team chat room to state change points 303 and 312 of the team chat room may be a normal use state, and the state of the team chat room after the state change points 303 and 312 may be a suspended state.

Referring to FIG. 3A, when a team chat room is in a normal use state at a participation point 302 in which a first participant participates in the team chat room, the first participant may view previous chat data (e.g., chatlog_1 through chatlog_4) stored in a shared drive through the team chat room in a normal use period according to access authority of the shared drive based on a state of the team chat room. However, while the team chat room is in a suspended state, the first participant may not view the previous chat data (e.g., chatlog_1 through chatlog_4) stored in the shared drive through the team chat room. In a suspended state, viewing the previous chat data (e.g., chatlog_1 through chatlog_4) stored in the shared drive may be restricted. However, after the state changes to the suspended state, chat data chatlog_9 through chatlog_12) transmitted and received in the team chat room may be stored in the shared drive based on access authority of the shared drive.

When the first participant receives the previous chat data (e.g., chatlog_1 through chatlog_4) of a team chat room in the normal use state, and the previous chat data (e.g., chatlog_1 through chatlog_4) is stored in a personal drive corresponding to an account of the first participant or in a terminal of the first participant, the first participant may access the personal drive or a memory in the terminal to view the previous chat data.

Referring to FIG. 3B, when a team chat room is in a suspended state at a participation point 313 at which a first participant participates in the team chat room, the first participant may not view previous chat data (e.g., chatlog_1 through chatlog_10) stored in a shared drive according to access authority of the shared drive based on the state of the team chat room. In the suspended state, viewing the previous chat data (e.g., chatlog_1 through chatlog_10) stored in the shared drive may be restricted. However, chat data (e.g., chatlog_11 and chatlog_12) transmitted and received in the team chat room after the state is changed to the suspended state may be stored in the shared drive based on access authority of the shared drive.

Figure 4A:
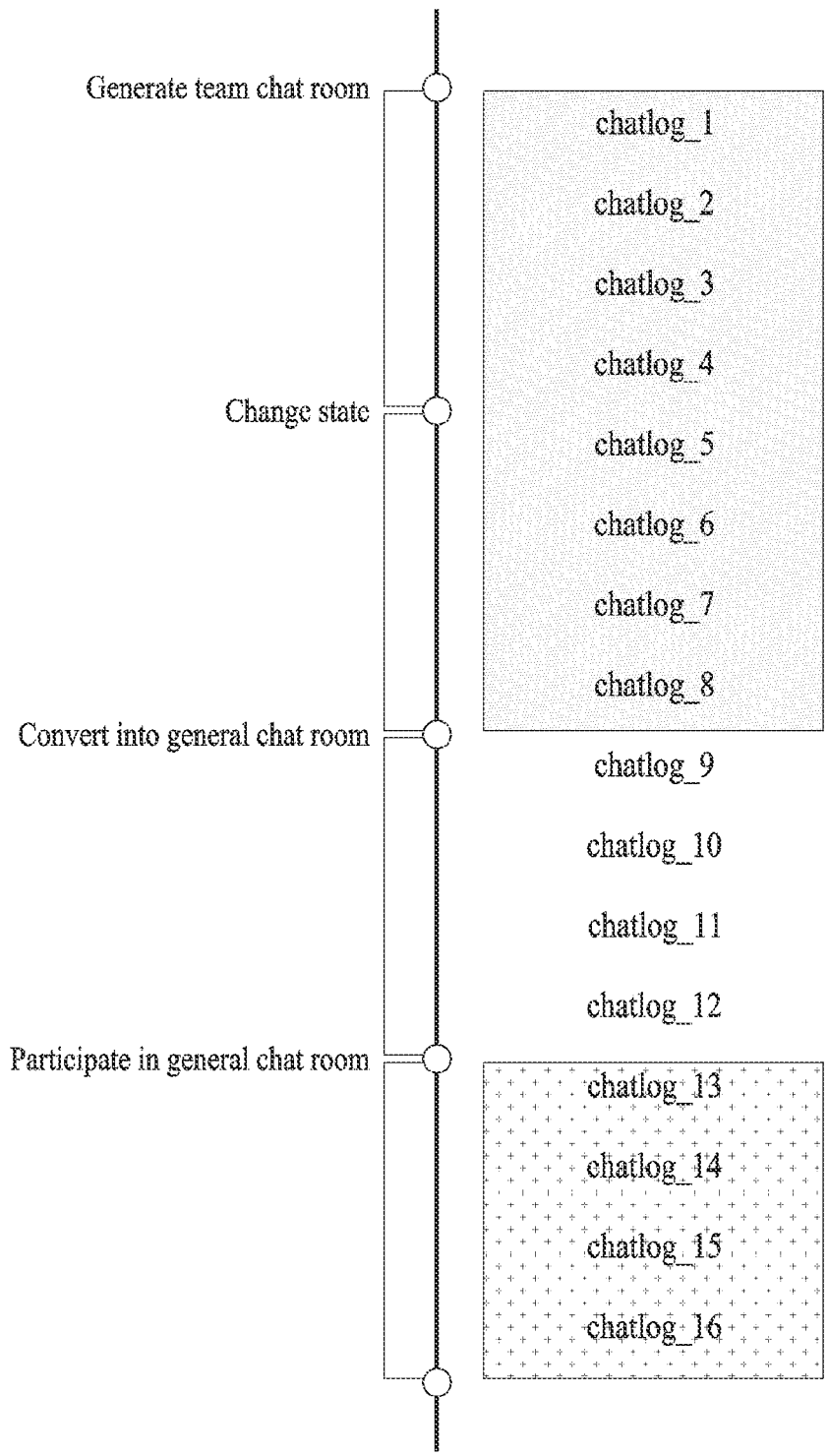

Referring to FIG. 4A, after a state of a team chat room is changed from a normal use state to a suspended state, a server may convert the chat room type from a team chat room into a general chat room based on a duration of the suspended state of the team chat room. As described above, in a case of a general chat room, access authority of the shared drive may be determined such that use of the shared drive is terminated. That is, for a general chat room, storage of the chat data in the shared drive may be restricted, and access authority of the shared drive may be determined such that viewing the chat data stored in the shared drive is also restricted. The server may terminate use of the shared drive based on a type conversion to a general chat room. According to an example embodiment, when the use of the shared drive is terminated, data stored in the shared drive may be deleted.

Chat data (e.g., chatlog_9 through chatlog_16) transmitted and received in a general chat room after a team chat room is converted into a general chat room may not be stored in the shared drive corresponding to the account of the administrator based on access authority of the shared drive.

After a team chat room is converted into a general chat room, the first participant participating in the converted chat room may not view the chat data (e.g., chatlog_1 through chatlog_12) from before the participating started through the general chat room based on access authority of the shared drive. The chat data (e.g., chatlog_13 through chatlog_16) transmitted and received in the general chat room after the participating started may be stored in the personal drive corresponding to the account or the terminal of the first participant based on the account type of the first participant.

Figure 4B:
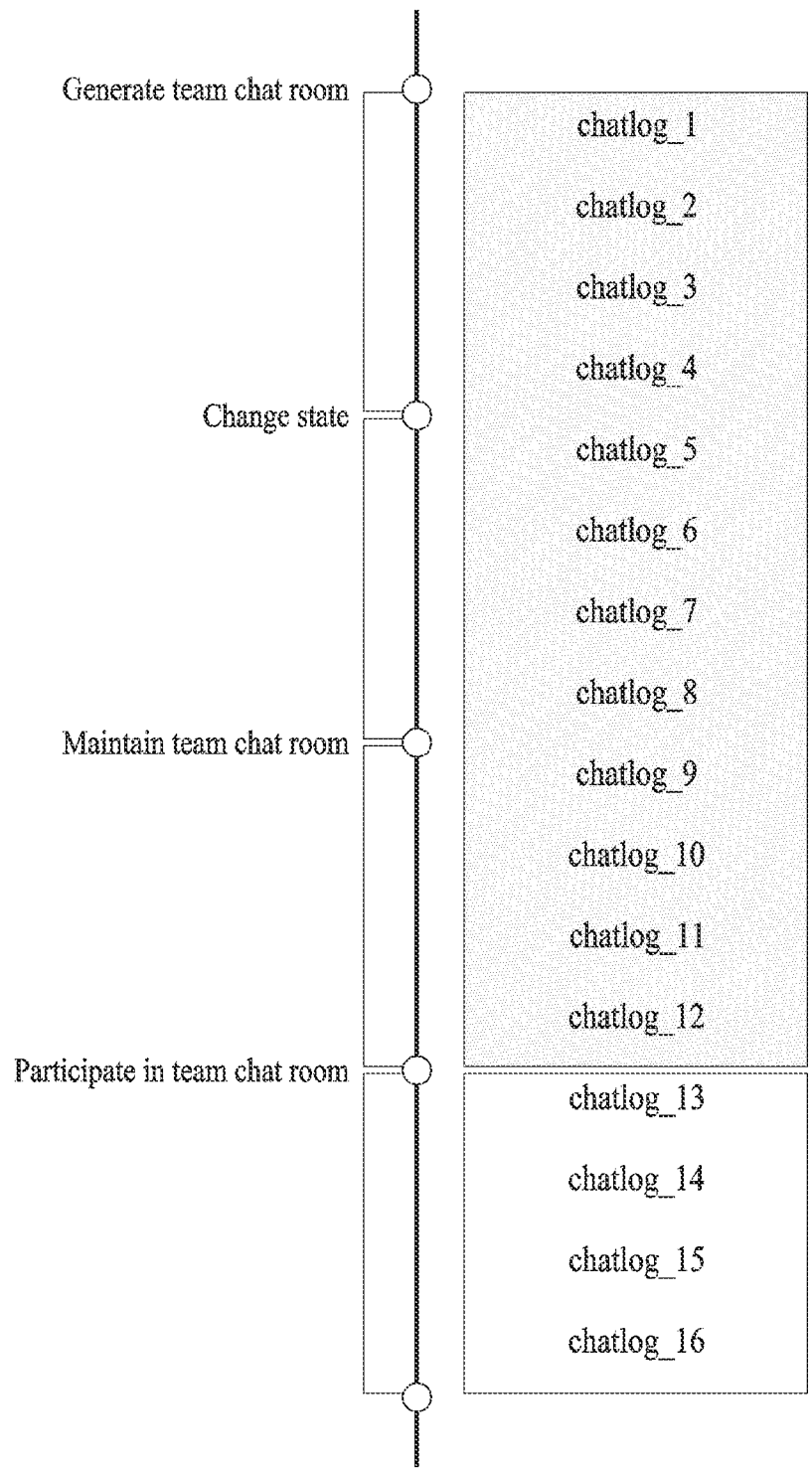

Referring to FIG. 4B, when an administrator account of a team chat room is maintained or converted into a first type account in a preset period after a state of the team chat room is changed from a normal use state to a suspended state, the team chat room may be maintained. When the administrator account of the team chat room is converted into the first type account, the suspended state of the team chat room may change back to the normal use state, and the team chat room may be maintained.

When the administrator account with a converted second type account is converted back into the first type account after the state of the team chat room is changed to the suspended state, the state of the team chat room may be changed back to the normal use state. For example, when the first type account is terminated and converted into the second type account because the administrator did not pay a service fee for maintaining the first type account, the second type account may be restored back to the first type account by paying the service fee again. When the administrator account is converted back into the first type account and administrator authority is returned, the state of the team chat room may be changed from the suspended state to the normal use state.

When the state of a team chat room is converted back into a normal use state, access authority of the shared drive may change back to correspond to the normal use state. That is, when the state of the team chat room is converted into the normal use state, access authority of the shared drive may change to correspond to the normal use state. When the administrator account is converted back into the first type account while the team chat room is in in the suspended state, the server may remove an access restriction on the chat data stored in the shared drive.

After the state of a team chat room is changed to the normal use state, the first participant participating in the team chat room may receive the previous chat data (e.g., chatlog_1 to chatlog_12) through the team chat room based on access authority of the shared drive corresponding to the normal use state. The previous chat data may include chat data transmitted and received in the suspended state.

When administrator authority is transferred to another participant with the first type account after the state of the team chat room is converted into the suspended state, the state of the team chat room may be converted back into the normal use state. When the administrator of the team chat room is changed to another participant with the first type account, the state of the team chat room may be converted from the suspended state into the normal use state. When the state of the team chat room is converted into the normal use state, access authority of the shared drive may change to correspond to a normal use state. When administrator authority is transferred to the participant with the first type account participating in the team chat room in the suspended state, the server may remove an access restriction on the chat data stored in the shared drive.

According to an example embodiment, a chat message for transferring administrator authority may be delivered to a user who is a transfer target through a notification account of art instant messenger. The notification account may be a separate account for providing a notification associated with an instant messaging service to individual users, and the user may receive various notification messages through a chat room from the notification account. The notification account may be implemented in a form of a chatbot in the corresponding chat room to deliver a notification message to the user.

According to an example embodiment, after an administrator of a team chat room is set, a preset administrator may be changed to another user. When an account type of the user set as the administrator is converted into another type, and the administrator loses the authority, the administrator of the team chat room may change. For example, when the administrator account is converted into the second type account because a user se as the administrator of the team chat room does not satisfy conditions for maintaining the first type account (e.g., payment for using a service), the administrator may lose the authority. According to an example embodiment, when the account of the user set as the administrator is not useable, the administrator may set another participant as the administrator even when the user set as the administrator is not a participant in the team chat room. The administrator may also set another participant as the administrator due to a request of the participant of the team chat room.

When the administrator of a team chat room changes, at least one of participants corresponding to the user account type to which administrator authority is given may be set as a new administrator. The new administrator may be assigned as an existing administrator or as a user selected by other participants in the team chat room or be automatically assigned based on a preset standard.

When the administrator of a team chat room changes from a first user to a second user, chat data of the team chat room stored in a shared drive corresponding to the first user may be moved to a shared drive corresponding to the second user. After the administrator is changed, the chat data transmitted and received in the team chat room may be stored in a shared drive corresponding to the second user.

Figure 5:
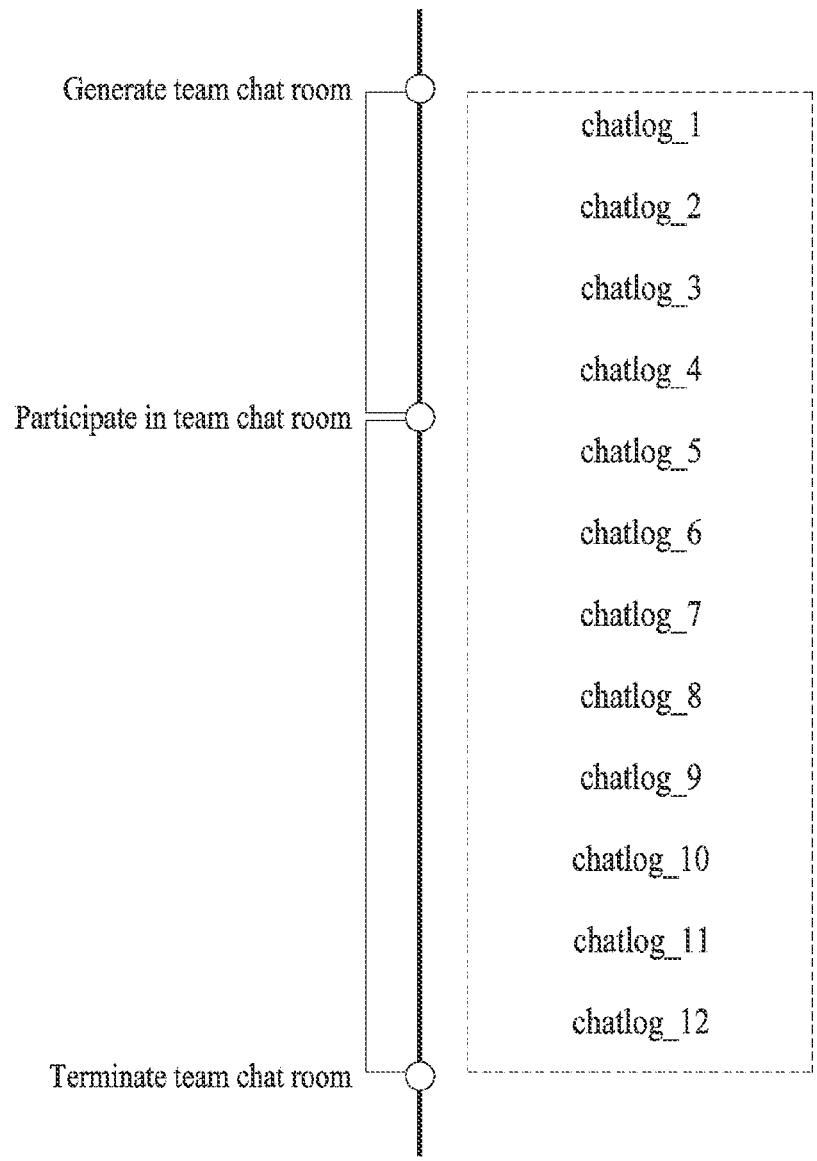
FIG. 5 illustrates an example of terminating a team chat room according to an example embodiment.

FIG. 5 illustrates an example of terminating a team chat room according to an example embodiment.

Referring to FIG. 5, a server may delete chat data (e.g., chatlog_1 through chatlog_12) in a shared drive by a request to terminate a team chat room. When the chat data transmitted and received in the team chat room is stored in a personal drive corresponding to a participant, the server may delete the chat data (e.g., chatlog_1 through chatlog_12) in the team chat room from the personal drive in response to the request to terminate the team chat room.

When a team chat room is terminated, the chat data (e.g., chatlog_1 through chatlog_12) transmitted and received in the team chat room in the shared drive corresponding to an administrator account and the personal drive corresponding to the first type account of the participant may be all deleted.

A request to terminate a team chat room may include a request to delete the team chat room by the administrator of the team chat room. The administrator of the team chat room may request the server to delete the team chat room, and the server may receive the request to delete the team chat room and store the chat data stored in the shared drive corresponding to the administrator of the team chat room and the personal drive corresponding to the participant of the team chat room. When the team chat room is terminated by the request to delete the team chat room, a chaffing process associated with a corresponding chat room may be terminated.

A request to terminate a team chat room may include a type conversion of the team chat room. As described above, when an administrator account of the team chat room is converted, the team chat room may be converted into a general chat room. The server may terminate the team chat room and convert the team chat room into a general chat room by deleting the chat data stored in the shared drive corresponding to the administrator of the team chat room and the chat data stored in the personal drive corresponding to the participant of the team chat room based on the converted administrator account. When a team chat room is terminated because the team chat room is converted, the chatting process of the corresponding chat room may proceed in the general chat room. That is, although participants of the team chat room may not be able to use functions provided in the team chat room, the participants may transmit and receive chat data through the type-converted chat room.

According to an example embodiment, when a participant leaves a team chat room or is removed from the team chat room by the administrator of the team chat room, the participant may not access the team chat room to view chat data of the team chat room and may not transmit or receive data through the team chat room. Chat data of a team chat room stored in a personal drive corresponding to a first participant may be deleted when the first participant leaves or is removed from the team chat room.

Figure 6A:
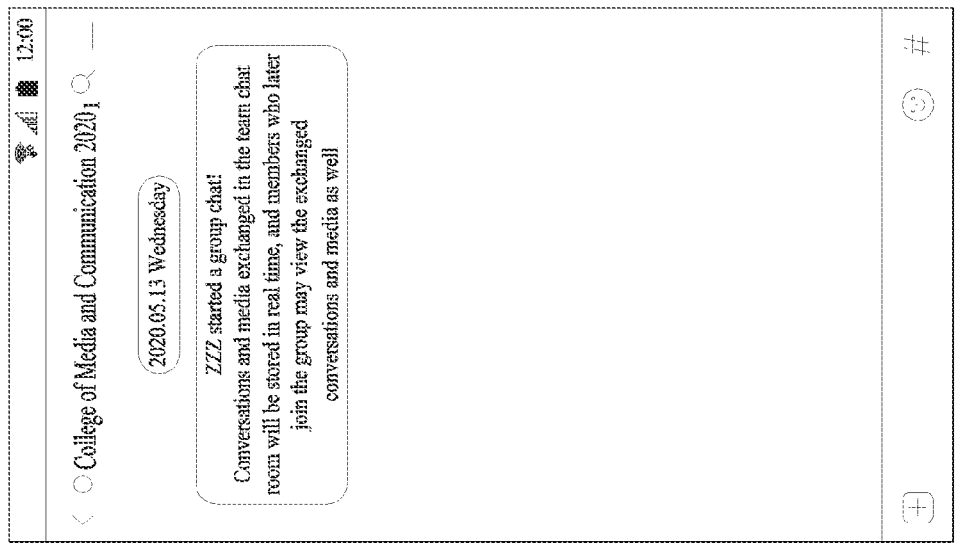
FIGS. 6A through 6C illustrate examples of an interface screen of an instant messenger for opening a team chat room according to example embodiments.
Figure 6B:
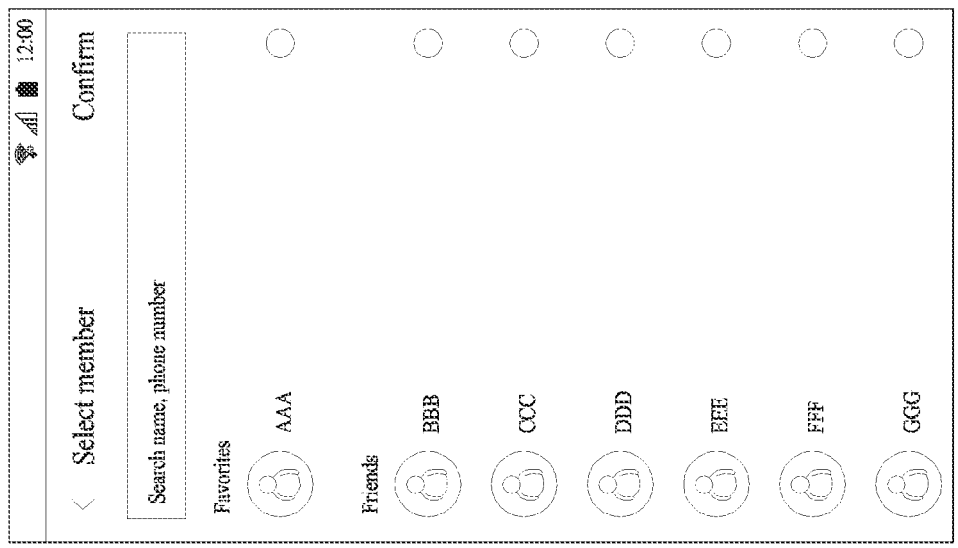
Figure 6C:
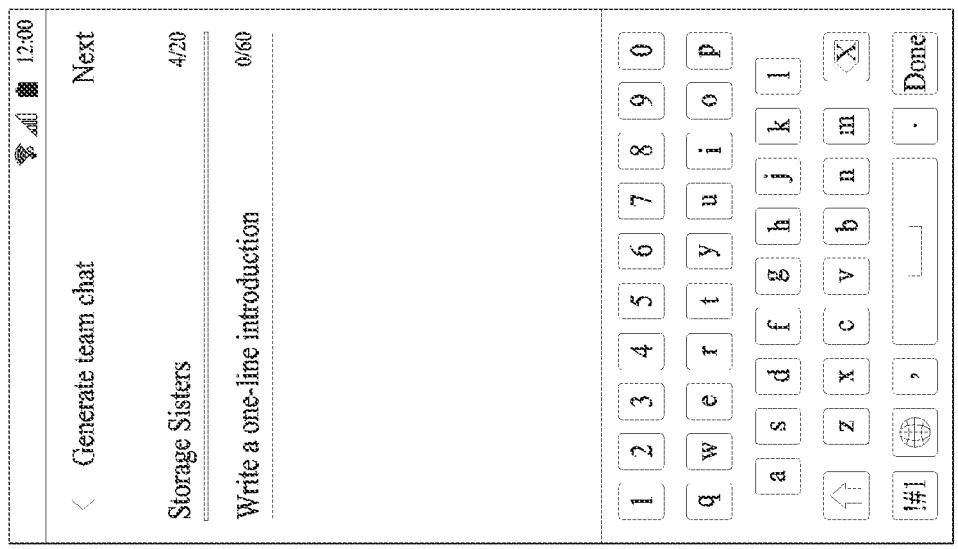

FIGS. 6A through 6C illustrate examples of an interface screen of an instant messenger for opening a team chat room according to example embodiments.

Referring to FIG. 6A, a user with a first type account of an instant messaging service may open a team chat room through an instant messenger. A team chat room generator may set a name for the team chat room, and the set name may be shared with participants of the team chat room. Referring to FIG. 6B, when a team chart room generator generates a team chat room, the team chat room generator may assign a participant to the team chat room. The team chat room generator may select one or more of users from among users registered as friends in the instant messenger as participants of the team chat room. Referring to FIG. 6C, a team chat room may be generated that includes a team chat room generator and a participant assigned by the team chat room generator.

Figure 7A:
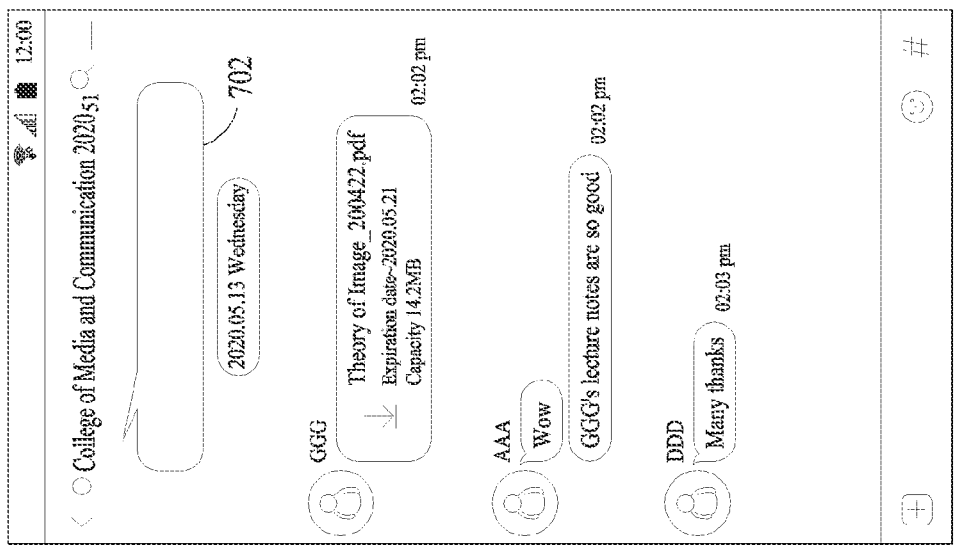
FIGS. 7A through 7C illustrate examples of an interface screen of an instant messenger for receiving previous chat data through a team chat room according to example embodiments.
Figure 7B:
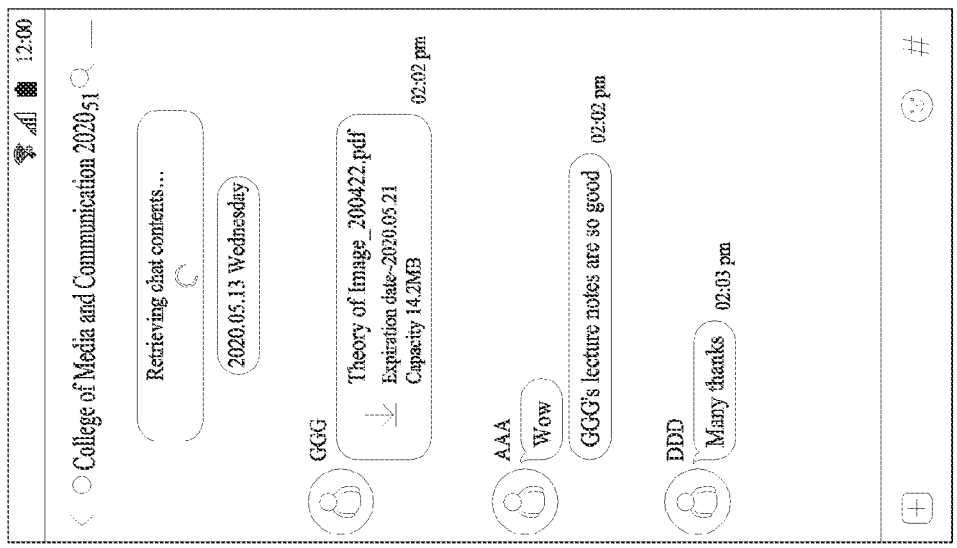
Figure 7C:
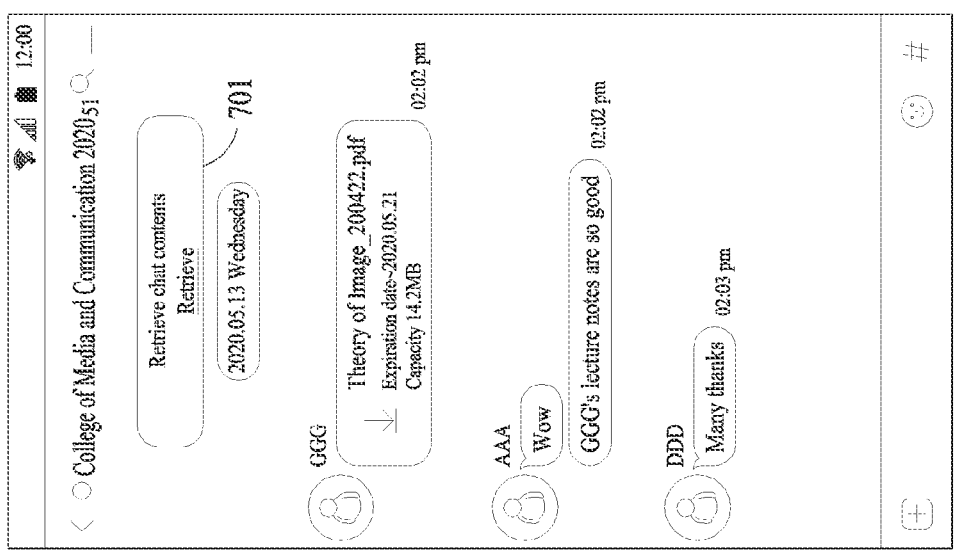

FIGS. 7A through 7C illustrate examples of an interface screen of an instant messenger for receiving previous chat data through a team chat room according to example embodiments.

As described above, a participant in a team chat room may receive chat data transmitted and received in a team chat room before they started to participate through the team chat room. For example, referring to FIG. 7A, the participant in the team chat room may request previous chat data from a server through an interface 701 for requesting the previous chat data. The server may access the previous chat data stored in a shared drive based on access authority of the shared drive. When the team chat room is in a normal use state, the server may access the previous chat data stored in the shared drive and provide the previous chat data to the participant who requested the previous chat data in the team chat room. Referring to FIG. 7C, the previous chat data obtained from the shared drive may be displayed in a form of a message 702 on an interface of the team chat room of the participant who requested the previous chat data. The previous chat data received from the interface of the team chat room may be displayed in the same manner as chat data that is subsequently displayed. Participants who receive the previous chat data may verify the previous chat data by moving their position on the interface of the team chat room in which the chat data is displayed in a chronological order. For example, a text message included in the previous chat data may be verified, and a media file included in the previous chat data may be downloaded on a terminal.

FIGS. SA through SD illustrate examples of an interface screen of an instant messenger for changing settings of a team chat room according to example embodiments.

Figure 8A:
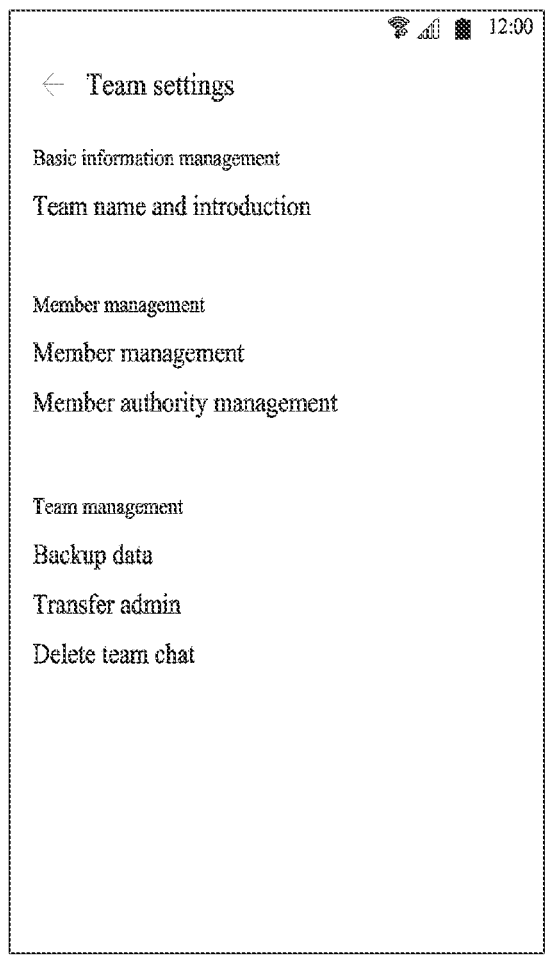
FIGS. 8A through 8D illustrate examples of an interface screen of an instant messenger for changing settings of a team chat room according to example embodiments.

Referring to FIG. 8A, an administrator of a team chat room may change settings of the team chat room through an interface of an instant messenger. The administrator of the team chat room may make a request to a server to change the settings of the team chat room through the interface, and the server may change the settings of the team chat room in response to the received request.

Figure 8B:
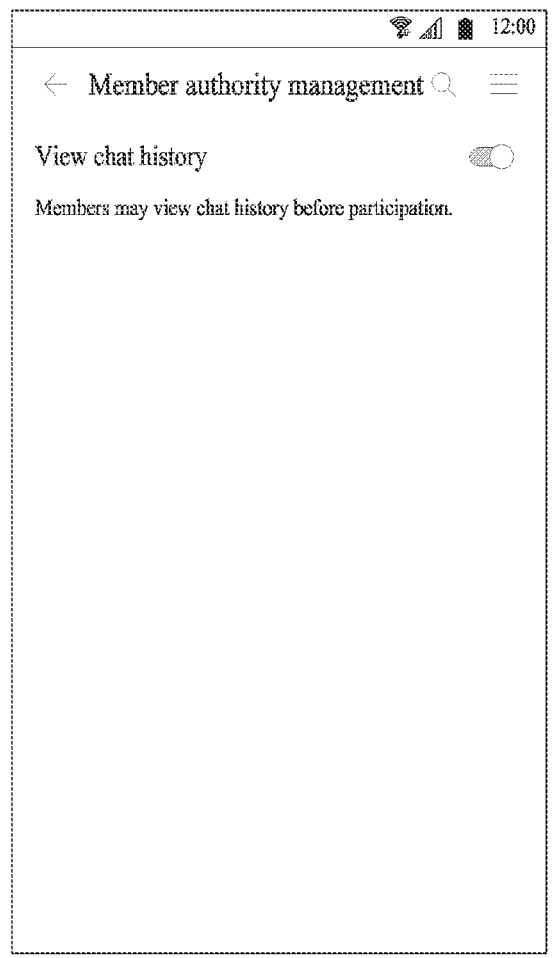

Referring to FIG. 8B, the administrator of the team chat room may change the settings associated with providing previous chat data. According to an example embodiment, access to data stored in a shared drive corresponding to an administrator account may be restricted by settings of the administrator of the team chat room.

When a team chat room is in a normal use state, access authority of the shared drive corresponding to the administrator account may be set as default to allow access to data stored in the shared drive, and when "view chat history" is deactivated by the administrator, access authority of the shared drive may change such that access to data stored in the shared drive is restricted.

When a team chat room is in a suspended state, access authority of the shared drive corresponding to the administrator account may be set as default to restrict access to the data stored in the shared drive, and when "view chat history" is activated by the administrator, access authority of the shared drive may change such that access to data stored in the shared drive is allowed.

Figure 8C:
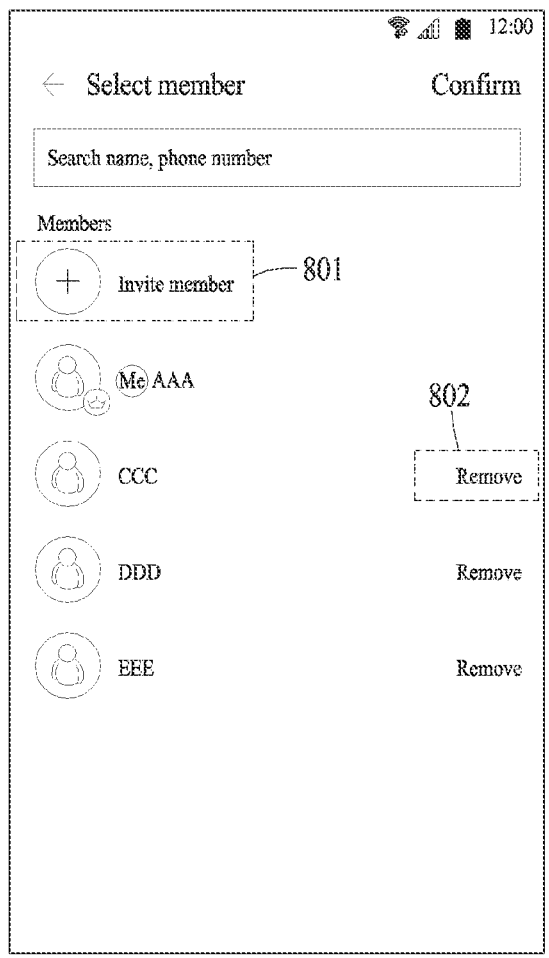

Referring to FIG. 8C, an administrator of a team chat room may manage participants of the team chat room through an interface of an instant messenger. For example, after the team chat room is generated, other participants or users may be invited to the team chat room such that participants are added to the team chat room, and a participant who is already participating may be removed from the team chat room.

Figure 8D:
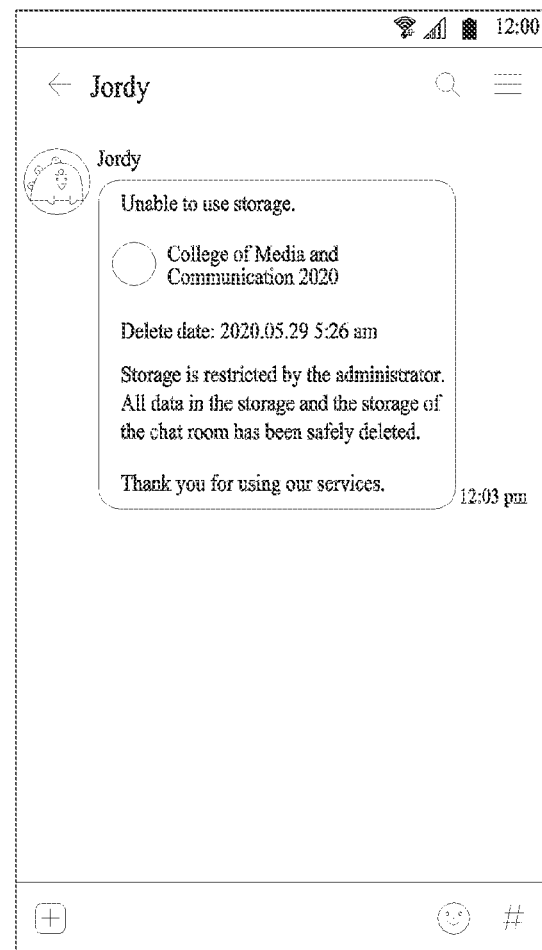

A member management interface in FIG. 8C may be converted into a member invitation interface by selecting a member invitation 801 to make a request to the server for an invitation for the selected member. In addition, by selecting the member invitation 801, an interface may be converted into a member removal interface 802 and a selected member may be removed from the team chat room According to an example embodiment, a participant removed by the administrator may be restricted from accessing the team chat room, and chat data of the team chat room stored in a personal drive of the removed participant may be deleted. Referring to FIG. 8D, in order to notify the removed participant that they have been removed from the team chat room, a notification in the form of a message about being removed from the team chat room may be provided through a notification account of the instant messenger.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory, cards, memory sticks, etc.), and the like. Examples of program instructions include both machine code, such as produced by a compiler, and files containing higher level code that may be executed by the computer using an interpreter.

The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation, Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure,

What is claimed is:

1. A method of operating an instant messaging server, comprising:
storing, by the instant messaging server, chat data transmitted and received in a first type chat room in a shared drive corresponding to an administrator with a first type account having an authority to manage the chat room;
determining, by the instant messaging server, at least one of a chat room type and a state of the chat room based on at least one of a type conversion of the administrator account, an account type of a changed administrator, and termination conditions set in response to the first type chat room;
receiving, by the instant messaging server, from a participant participating in the chat room, a request for a previous chat data transmitted and received in the chat room before the participant started participating, the instant messaging server being configured to provision the chat room on a user terminal of the participant;
determining, by the instant messaging server, whether access to the shared drive is allowed based on at least one of the chat room type and the state of the chat room; and
providing, by the instant messaging server, the previous chat data stored in the shared drive to the participant based on a determination that the access to the shared drive is allowed.

2. The method of claim 1, further comprising:
changing the determination that the access to the shared drive is allowed based on a type conversion of the chat room by the administrator account.

3. The method of claim 1, further comprising:
converting the chat room type into a second type when the administrator account is converted into a second type account; and
terminating use of the shared drive in response to a type conversion of the chat room.

4. The method of claim 1, further comprising:
managing the first type chat room in a suspended state when the administrator account is converted into a second type account; and
restricting the access to the chat data stored in the shared drive while the suspended state continues.

5. The method of claim 4, further comprising:
converting the chat room type into a second type based on a duration of the suspended state; and
terminating use of the shared drive based on a type conversion of the chat room.

6. The method of claim 4, further comprising:
removing an access restriction on the chat data stored in the shared drive when the administrator account is converted into the first type account in the suspended state.

7. The method of claim 4, further comprising:
removing an access restriction on the chat data stored in the shared drive when an administrator authority is transferred to a participant with the first type account participating in the chat room in the suspended state.

8. The method of claim 1, further comprising:
receiving, from a user, a request to generate the chat room to which at least one participant is assigned;
generating, as the first type, the chat room comprising the user and at least one participant based on an account type of the user;
allocating a space for the chat room in the shared drive; and
setting the user as the administrator of the chat room.

9. The method of claim 1, further comprising:
storing at least one of the chat data transmitted and received in the chat room after the participant started participating and the previous chat data in a personal drive corresponding to the participant based on an account type of the participant.

10. The method of claim 9, further comprising:
deleting the chat data stored in the shared drive corresponding to the administrator in response to a request to terminate the chat room; and
deleting the chat data stored in the personal drive corresponding to the participant.

11. The method of claim 1, further comprising inputting a setting to the instant messaging server to allow the access to the shared drive for previous chat data in the chat room, the setting being configurable in a graphical user interface.

12. A non-transitory computer-readable storage medium storing instructions that, when executed by a processor, cause the processor to perform the method of claim 1.

13. An instant messaging server, comprising:
a processor,
wherein the processor is configured to:
store, by the processor, chat data transmitted and received in a first type chat room in a shared drive corresponding to an administrator with a first type account having an authority to manage the chat room;
receive, by the processor from a participant participating in a chat room, a request for a previous chat data transmitted and received in the chat room before the participant started participating, the processor being configured to provision the chat room on a user terminal of the participant;
determine, by the processor, at least one of a chat room type and a state of the chat room based on a conversion history of an account type of the administrator of the chat room;
determine, by the processor, whether the access to the shared drive is allowed based on at least one of the chat room type and the state of the chat room; and
provide, by the processor, the previous chat data stored in the shared drive to the participant based on a determination that the access to the shared drive is allowed.

14. The instant messaging server of claim 13, wherein the processor is configured to:
convert the chat room type into a second type when the administrator account is converted into a second type account; and
terminate use of the shared drive in response to a type conversion of the chat room.

15. The instant messaging server of claim 13, wherein the processor is configured to:
manage the first type chat room in a suspended state when the administrator account is converted into a second type account; and
restrict the access to the chat data stored in the shared drive while the suspended state continues.

16. The instant messaging server of claim 15, wherein the processor is configured to:
convert the chat room type into a second type based on a duration of the suspended state; and
terminate use of the shared drive based on a type conversion of the chat room.

17. The instant messaging server of claim 15, wherein the processor is configured to:
remove an access restriction on the chat data stored in the shared drive when the and administrator account is converted into the first type account in the suspended state.

18. The instant messaging server of claim 15, wherein the processor is configured to:
remove an access restriction on the chat data stored in the shared drive when an administrator authority is transferred to a participant with the first type account participating in the chat room in the suspended state.

19. The instant messaging server of claim 13, wherein the processor is configured to:
receive, from a user, a request to generate the chat room to which at least one participant is assigned;
generate, as the first type, the chat room comprising the user and at least one participant based on an account type of the user;
allocate a space for the chat room in the shared drive; and
set the user as the administrator of the chat room.

20. The instant messaging server of claim 13, wherein the processor is configured to:
store at least one of the chat data transmitted and received in the chat room after the participant started participating and the previous chat data in a personal drive corresponding to the participant based on an account type of the participant.

* * * * *